United States Patent
Dasari et al.

(10) Patent No.: US 10,114,747 B2
(45) Date of Patent: Oct. 30, 2018

(54) SYSTEMS AND METHODS FOR PERFORMING OPERATIONS ON MEMORY OF A COMPUTING DEVICE

(71) Applicant: Lenovo Enterprise Solutions (Singapore) Pte. Ltd., New Tech Park (SG)

(72) Inventors: Shiva R. Dasari, Austin, TX (US); Scott N. Dunham, Apex, NC (US); Sumeet Kochar, Cary, NC (US)

(73) Assignee: Lenovo Enterprise Solutions (Singapore) Pte. Ltd., New Tech Park (SG)

( * ) Notice: Subject to any disclaimer, the term of this patent is extended or adjusted under 35 U.S.C. 154(b) by 50 days.

(21) Appl. No.: 14/711,279

(22) Filed: May 13, 2015

(65) Prior Publication Data
US 2016/0335005 A1    Nov. 17, 2016

(51) Int. Cl.
*G06F 13/00*   (2006.01)
*G06F 12/06*   (2006.01)
*G06F 8/654*   (2018.01)

(52) U.S. Cl.
CPC .......... *G06F 12/0638* (2013.01); *G06F 8/654* (2018.02); *G06F 2212/205* (2013.01)

(58) Field of Classification Search
CPC . G06F 12/02; G06F 12/14; G06F 9/24; G06F 17/00
See application file for complete search history.

(56) References Cited

U.S. PATENT DOCUMENTS

| | | | | |
|---|---|---|---|---|
| 2002/0174304 A1* | 11/2002 | Wang | ............... | G06F 12/0897 711/144 |
| 2011/0040960 A1* | 2/2011 | Deierling | ............. | G06F 21/572 713/2 |
| 2013/0086571 A1* | 4/2013 | Dasari | ................... | G06F 8/665 717/168 |
| 2013/0138940 A1* | 5/2013 | Wang | ................ | G06F 11/1417 713/2 |
| 2013/0254527 A1* | 9/2013 | Zhang | ................ | G06F 9/4401 713/100 |
| 2014/0372668 A1* | 12/2014 | Yeh | ..................... | G06F 12/0246 711/103 |

* cited by examiner

*Primary Examiner* — Charles Rones
*Assistant Examiner* — Han Doan
(74) *Attorney, Agent, or Firm* — Olive Law Group, PLLC

(57) ABSTRACT

Systems and methods for performing operations on memory of a computing device are disclosed. According to an aspect, a method includes storing update data on a first memory of a computing device, wherein the update data comprises data for updating a second memory on the computing device. The method also includes initiating an update mode on the second memory. Further, the method includes suspending an I/O operation of the second memory. The method also includes switching the computing device to a system management mode (SMM) while the second memory is in the update mode. Further, the method includes retrieving the update data from the first memory. The method also includes determining whether the update data is valid. The method also includes resuming the I/O operation of the second memory for updating the second memory based on the retrieved update data in response to determining that the update data is valid.

17 Claims, 8 Drawing Sheets

SYSTEMS AND METHODS FOR PERFORMING OPERATIONS ON MEMORY OF A COMPUTING DEVICE

TECHNICAL FIELD

The presently disclosed subject matter relates to computing systems. More specifically, the presently disclosed subject matter relates to systems and methods for performing operations on a computing device, such as a memory of a server or a personal computer (PC).

BACKGROUND

Typically, an x86 PC, x86 server, or other type of computing device includes an embedded baseboard management controller (BMC) system firmware. Modifying the embedded BMC system firmware such that the BMC is no longer functional may cause denial of service (DoS) of the computing device. The BMC system firmware is an updatable entity in which operating system (OS) based utilities provide a way to modify the BMC read only memory (ROM) containing the BMC firmware. Upon system restart, the BMC system firmware is loaded from the BMC ROM for execution by the BMC microcontroller.

One technique maintains a backup copy of BMC ROM image and relies on the backup copy of the BMC ROM image so that this image can be used during system restart to provide a BMC firmware image when the primary or original copy has been corrupted and is invalid. This technique may not provide recovery if both the ROM back up image and the primary image has become corrupted. Yet another technique requires the expense of additional hardware logic to prevent host-based access to the serial peripheral interface (SPI) that controls the access to the BMC ROM.

Another technique for basic input/output system/unified extensible firmware (BIOS/UEFI) ROM protection may use suitable chipset hooks that prevent writing to the system address range of the BIOS/UEFI ROM unless the CPU is in the secure SMM mode. However, this technique does not work for the BMC ROM, because the BMC ROM image executes in the BMC microcontroller environment so it is not visible in host system address space.

In view of the foregoing, there is a need for improved systems and techniques for performing operations on memory of a computing device and for protecting BMC ROM.

SUMMARY

Disclosed herein are systems and methods for performing operations on memory of a computing device. In accordance with embodiments, a method includes storing update data on a first memory of a computing device, wherein the update data comprises data for updating a second memory on the computing device. The method also includes initiating an update mode on the second memory. Further, the method includes suspending an input/output (I/O) operation of the second memory. The method also includes switching the computing device to a system management mode (SMM) while the second memory is in the update mode. Further, the method includes retrieving the update data from the first memory. The method also includes determining whether the update data is valid. The method also includes resuming the I/O operation of the second memory for updating the second memory based on the retrieved update data in response to determining that the update data is valid.

BRIEF DESCRIPTION OF THE DRAWINGS

The illustrated embodiments of the disclosed subject matter will be best understood by reference to the drawings, wherein like parts are designated by like numerals throughout. The following description is intended only by way of example, and simply illustrates certain selected embodiments of devices, systems, and processes that are consistent with the disclosed subject matter as claimed herein.

DETAILED DESCRIPTION

Figure 1:
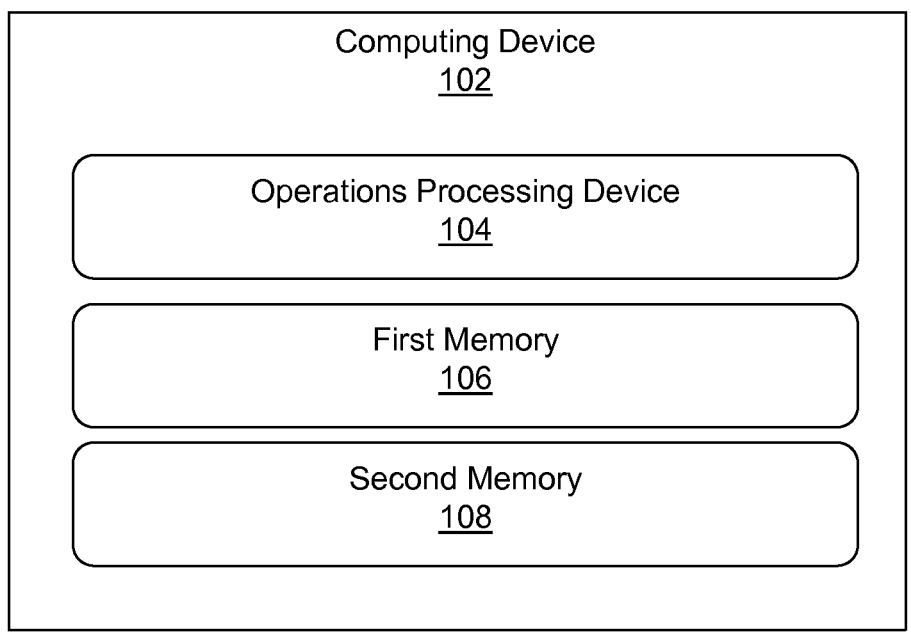
FIG. 1 is a block diagram illustrating system elements of an exemplary computing device, in accordance with an embodiment of the present disclosure.

The following detailed description is made with reference to the figures. Exemplary embodiments are described to illustrate the disclosure, not to limit its scope, which is defined by the claims. Those of ordinary skill in the art will recognize a number of equivalent variations in the description that follows.

The functional units described in this specification have been labeled as devices. A device may be implemented in programmable hardware devices such as processors, digital signal processors, central processing units, field programmable gate arrays, programmable array logic, programmable logic devices, cloud processing systems, or the like. The devices may also be implemented in software for execution by various types of processors. An identified device may include executable code and may, for instance, comprise one or more physical or logical blocks of computer instructions, which may, for instance, be organized as an object, procedure, function, or other construct. Nevertheless, the executables of an identified device need not be physically located together, but may comprise disparate instructions stored in different locations which, when joined logically together, comprise the device and achieve the stated purpose of the device.

An executable code of a device may be a single instruction, or many instructions, and may even be distributed over several different code segments, among different applications, and across several memory devices. Similarly, operational data may be identified and illustrated herein within the device, and may be embodied in any suitable form and organized within any suitable type of data structure. The operational data may be collected as a single data set, or may be distributed over different locations including over different storage devices, and may exist, at least partially, as electronic signals on a system or network.

The described features, structures, or characteristics may be combined in any suitable manner in one or more embodiments. In the following description, numerous specific details are provided, to provide a thorough understanding of embodiments of the disclosed subject matter. One skilled in the relevant art will recognize, however, that the disclosed subject matter can be practiced without one or more of the specific details, or with other methods, components, materials, etc. In other instances, well-known structures, materials, or operations are not shown or described in detail to avoid obscuring aspects of the disclosed subject matter.

As used herein, a "computing device" includes a single device capable of communicating, and exchanging one or messages with other devices present in a network. The computing device is also configured to connect to a network, such as the Internet. Further, the computing device may include hardware, software, firmware, or combination of these. Examples of the computing device may include, but are not limited to, a mobile phone, a smart phone, a server, a personal computer, a laptop, a tablet computer, and the like.

As used herein, a "user interface" can include an interface on the device enabling a user to interact with the device or computing device. For example, a user interface may include a display (e.g., a touchscreen display), a keyboard, a mouse, or the like.

As used herein, an "x86" refers to a family of backward compatible instruction set architectures that are based on Intel 8086 central processing unit (CPU).

As used herein, a unified extensible firmware interface (UEFI) refers to a specification for a software program that can connect a computer's firmware to an operating system (OS) of the computer.

As used herein, a baseboard management controller (BMC) is a processor that may monitor the physical state of a computer, network server, or other higher device using sensors. The BMC may be part of an intelligent platform management interface (IPMI) and can be part of the motherboard or main circuit board of the device to be monitored. The sensors of the BMC can measure internal physical variables such as temperature, humidity, power-supply voltage, fan speeds, communications parameters and functions of the OS.

As used here, a random access memory (RAM) refers to a storage device in the computing device. RAM is a volatile memory of the computing device and requires a continuous source of power to retain information. When the power is turned off, the RAM may lose the information stored therein.

As used here, a read only memory (ROM) refers to a storage device or memory in the computing device. The ROM is a non-volatile memory and does not require a continuous source of power to retain information stored in it.

As used herein, an operations processing device refers to a device, hardware, software, firmware or combination of these, for performing one or more operations on a memory such as, ROM of the computing device.

Further, as used herein, a memory refers to a storage device of a computing device.

The device or system for performing one or more operations on a memory of a computing device may be a software, hardware, firmware, or combination of these. The device or the system is further intended to include or otherwise cover all software or computer programs capable of performing the various heretofore-disclosed determinations, calculations, or the like for the disclosed purposes. For example, exemplary embodiments are intended to cover all software or computer programs capable of enabling processors to implement the disclosed processes. Exemplary embodiments are also intended to cover any and all currently known, related art or later developed non-transitory recording or storage mediums (such as a CD-ROM, DVD-ROM, hard drive, RAM, ROM, floppy disc, magnetic tape cassette, etc.) that record or store such software or computer programs. Exemplary embodiments are further intended to cover such software, computer programs, systems and/or processes provided through any other currently known, related art, or later developed medium (such as transitory mediums, carrier waves, etc.), usable for implementing the exemplary operations disclosed below.

In accordance with the exemplary embodiments, the disclosed computer programs can be executed in many exemplary ways, such as an application that is resident in the memory of a device or as a hosted application that is being executed on a server and communicating with the device application or browser via a number of standard protocols, such as TCP/IP, HTTP, XML, SOAP, REST, JSON and other sufficient protocols. The disclosed computer programs can be written in exemplary programming languages that execute from memory on the device or from a hosted server, such as BASIC, COBOL, C, C++, Java, Pascal, or scripting languages such as JavaScript, Python, Ruby, PHP, Perl, or other suitable programming languages.

The present disclosure provides methods and systems for performing one or more operations on a memory, such as a ROM, of a computing device. The computing device can be a server, a personal computer (PC), a laptop, a tablet computer, and the like. The computing device may primarily include two memories, i.e. a first memory (e.g. RAM) and a second memory (e.g., ROM). An update data may be stored on a first memory of a computing device. Example update data may include operations data for performing one or more operations on the ROM of the computing device. The update data may be data for updating the second memory on the computing device. An update mode may be initiated on the second memory. Further, an input/output (I/O) operation of the second memory may be suspended. Then, the computing device may be switched to a system management mode (SMM) while the second memory is in the update mode. Then, the update data may be retrieved from the first memory and it is determined whether the update data is valid data or not. In some embodiments, validation of the update data happens by checking the signature of the update data using a public key associated with the private key used to sign the update data. In response to determining that the update data is valid, the I/O operation of the second memory for updating the second memory is resumed.

FIG. 1 illustrates a block diagram of example system elements 100 of a computing device 102 in accordance with embodiments of the present disclosure. The computing device 102 may include an operations processing device 104, a first memory 106, and a second memory 108. Examples of the computing device 102 may include, but are not limited to, desktop computer, laptop, server, tablet computer, and the like. The first memory 106 may store update data for updating the second memory 108 of the computing device 102. The computing device 102 may also include an operating system. Examples of the operating system may include, but are not limited to, Windows XP®, LINUX®, DOS, UNIX®, and so forth. The update data may include operations data for performing one or more operations. In an embodiment, the update data includes operations data for performing one or more operations on the second memory 108. The second memory may be a ROM of a BMC.

In some embodiments, the operations processing device 104 is configured to store, in the first memory 106, a memory address of a memory location where the update data is stored in the first memory 106. The operations processing device 104 may be configured to initiate an update mode on the second memory 108. The operations processing device 104 may also be configured to suspend an input/output (I/O) operation of the second memory 108. The operations processing device 104 may also be configured to switch the computing device 102 to a system management mode (SMM) while the second memory 108 is in the update mode. The operations processing device 104 is also configured to retrieve the update data from the first memory 106. The operations processing device 104 is also configured to determine whether the update data is valid. In some embodiments, the operations processing device 104 validate the update data by checking the signature of the update data using a public key associated with the private key used to sign the update data. The operations processing device 104 may further be configured to resume the I/O operation of the second memory 108 for updating the second memory 108 in response to determining that the update data is valid. Further, the operations processing device 104 may update the second memory 108 based on the retrieved update data. In some embodiments, the operations processing device 104 may also be configured to prevent updating of the second memory 108 with the update data in response to determining that the update data is invalid.

Figure 2:
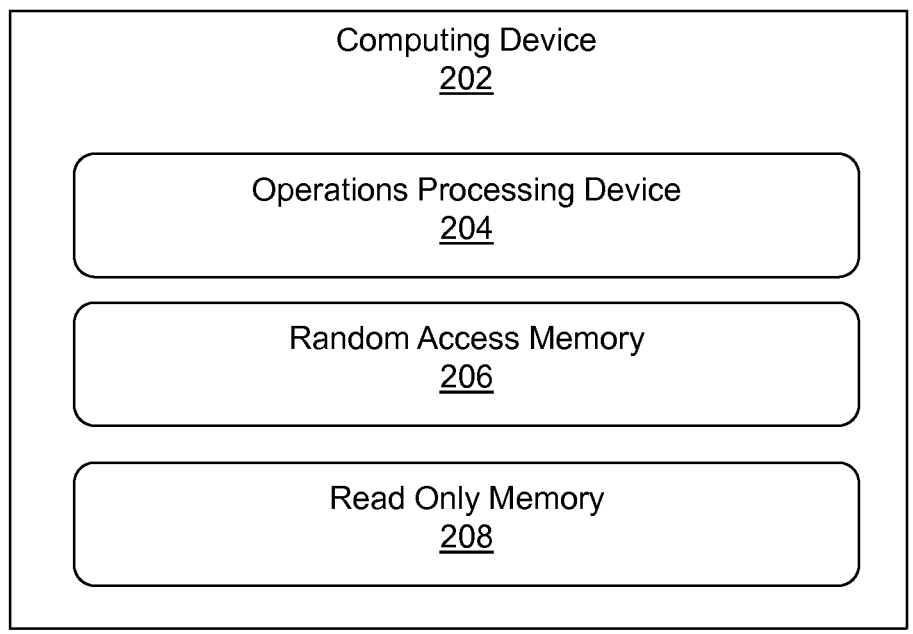
FIG. 2 is a block diagram illustrating system elements of another exemplary computing device, in accordance with another embodiment of the present disclosure.

FIG. 2 illustrates a block diagram of example system elements 200 of a computing device 202, in accordance with embodiments of the present disclosure. The computing device 202 may primarily include an operations processing device 204, a random access memory (RAM) 206, and a read only memory (ROM) 208. Examples of the computing device 202 may include, but are not limited to, a desktop computer, a laptop, a server, a tablet computer, and so forth. The RAM 206 may store update data for updating the ROM 208 of the computing device 202. The update data may include operations data for performing one or more operations. The update data may include strings of bytes. In an embodiment, the update data includes operations data for performing one or more operations on the ROM 208. The ROM 208 may be a read only memory (ROM) of a baseboard management controller (BMC).

In embodiments, the operations processing device 204 is configured to store, in the RAM 206, a memory address of a memory location where the update data is stored in the RAM 206. The operations processing device 204 may be configured to initiate an update mode on the ROM 208. The operations processing device 204 may also be configured to suspend an input/output (I/O) operation of the ROM 208. The operations processing device 204 may also be configured to switch the computing device 202 to a system management mode (SMM) while the ROM 208 is in the update mode. The operations processing device 204 is also configured to retrieve the update data from the RAM 206. The operations processing device 204 is also configured to determine whether the update data is valid. In some embodiments, the operations processing device 204 validate the update data by checking the signature of the update data using a public key associated with the private key used to sign the update data.

The operations processing device 204 may further be configured to resume the I/O operation of the ROM 208 for updating the ROM 208 in response to determining that the update data is valid. Further, the operations processing device 204 may update the ROM 208 based on the retrieved update data. In some embodiments, the operations processing device 204 may also be configured to prevent updating of the ROM 208 with the update data in response to determining that the update data is invalid.

Figure 3:
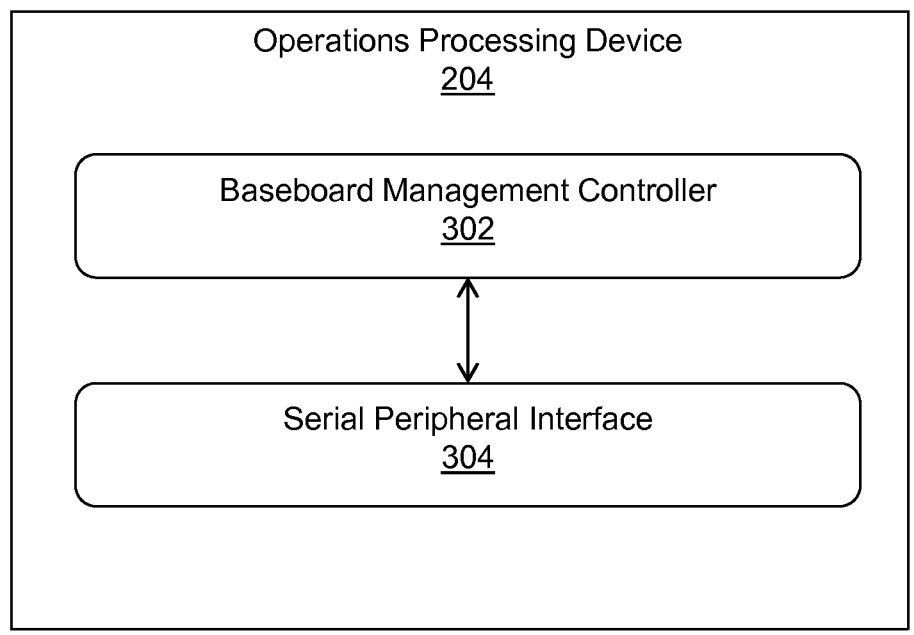
FIG. 3 is a block diagram illustrating system elements of an operations processing device of FIG. 1 and FIG. 2, in accordance with another embodiment of the present disclosure.

FIG. 3 illustrates a block diagram of system elements 300 of the exemplary operations processing device 204 of FIG. 2 in accordance with embodiments of the present disclosure. Referring to FIG. 3, the operations processing device 204 may include a BMC 302. The BMC 302 may be a specialized service processing device for monitoring the physical state of the computing device 202, a network server, or other hardware device by using sensors, and communicating with other devices. In some embodiments, the BMC 302 may be part of an intelligent platform management interface (IPMI) and is usually present in a motherboard or main circuit board of the computing device 202. The sensors of the BMC 302 may be configured to measure internal physical variables such as, but not limited to, humidity, temperature, power-supply voltage, fan speeds, communication parameters and operating system functions.

The operations processing device 204 may also include a serial peripheral interface (SPI) 304 of the BMC 302. The SPI 304 may be configured to control access to the second memory 108 or the ROM 208. The SPI 304 may also include an SPI controller (not shown) may be configured to receive one or more commands for updating the ROM 208 or a BMC ROM. The BMC 302 may also be configured to directly access the SPI controller to accomplish update of the BMC ROM without use of a host CPU of the BMC 302. This may protects against invalid update of the BMC ROM or the ROM 208 via the host CPU based access method.

The operations processing device 204 may also include a system management interrupt (SMI) handler 306. The SMI handler 306 may be configured to retrieve a memory address of the memory location where an update data is stored in the first memory 106 or RAM 206 as discussed with reference to FIG. 1 and FIG. 2. The SMI handler 306 may also be configured to retrieve the update data from the second memory 108 or the RAM 208. The SMI handler 306 may also be configured to validate the retrieved update data or image. Hereinafter, the update data and the update image are same and may be used interchangeably without changing its meaning. The SMI handler 306 may also be configured to validate the update data by checking a signature of the data using a public key associated with a private key used to sign the update data. The SMI handler 306 is configured to resume I/O operation of the ROM 208. The SMI handler 306 may be configured to transfer an update data to the second memory 108 or the ROM 208.

Figure 4A:
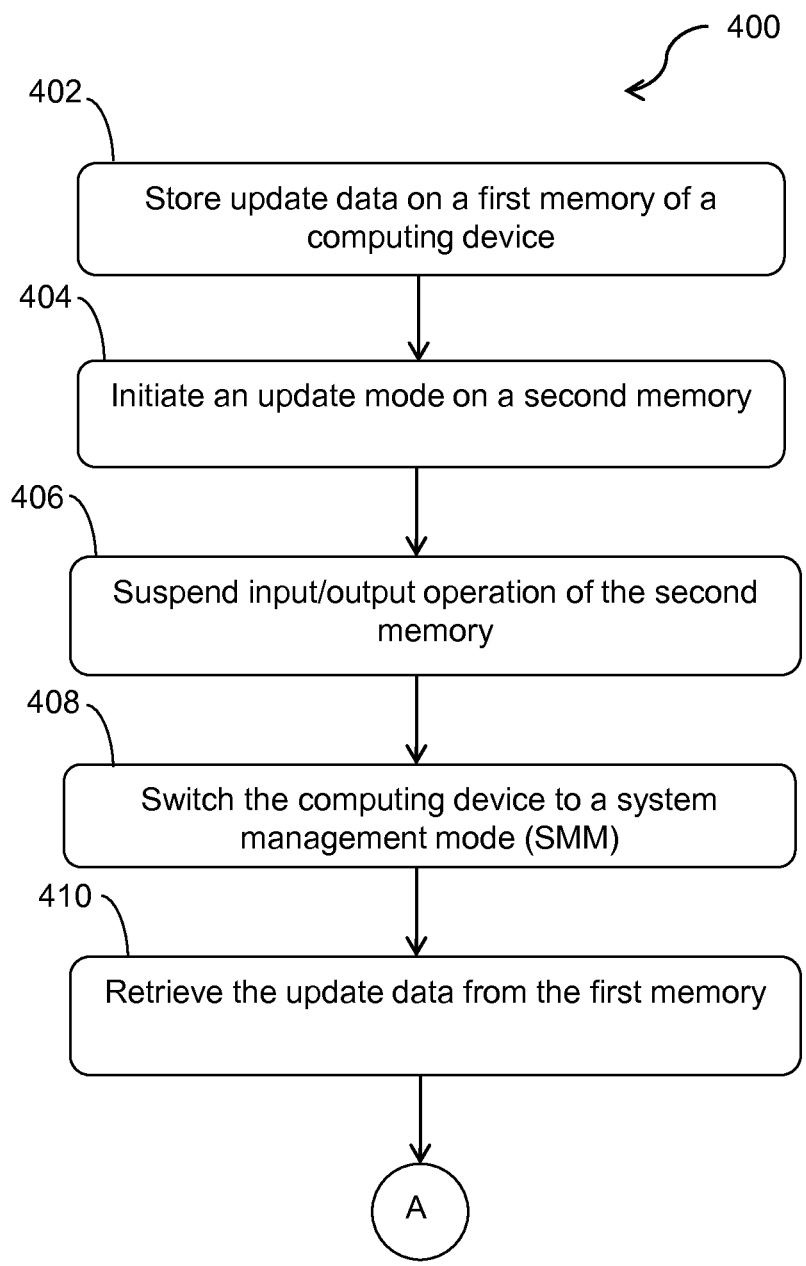
FIGS. 4A-4B is a flowchart illustrating an exemplary method for performing one or more operations on a second memory of a computing device, in accordance with an embodiment of the present disclosure.
Figure 4B:
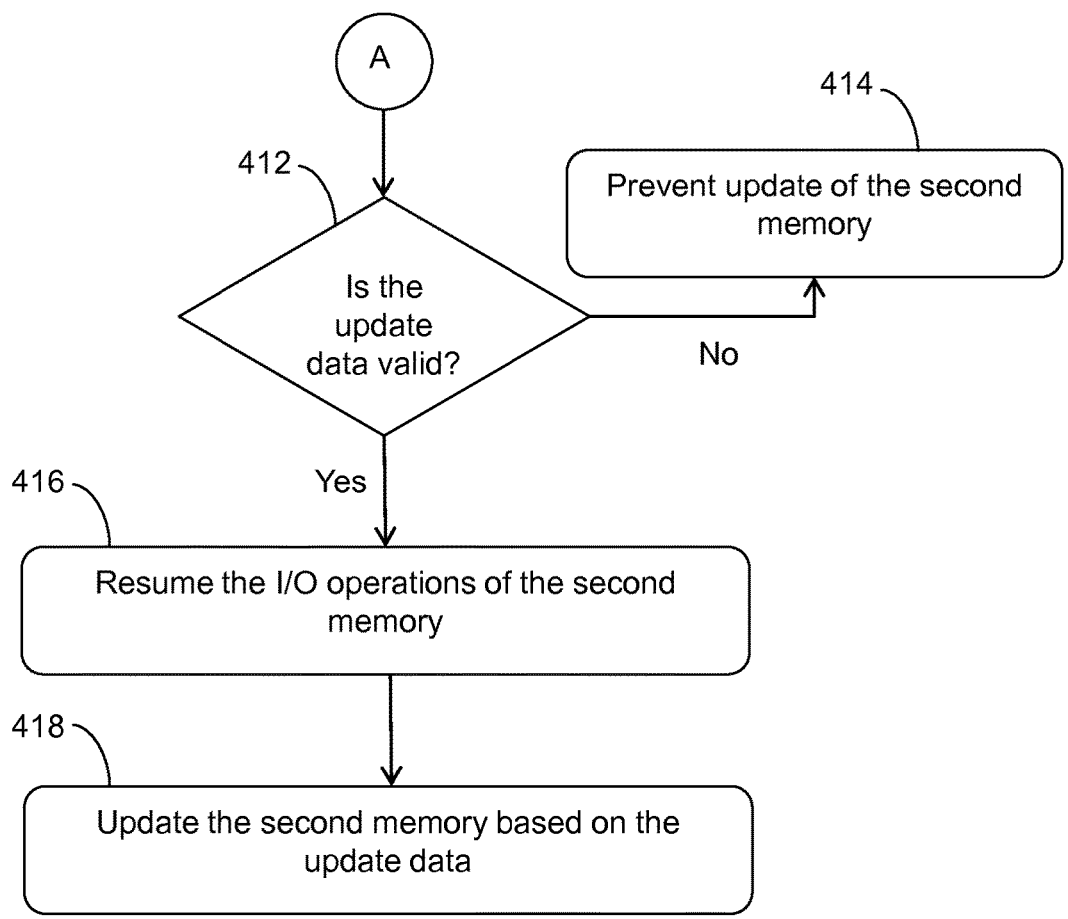

FIGS. 4A and 4B illustrates a flowchart of an example method 400 for performing one or more operations on a memory of a computing device in accordance with embodiments of the present disclosure. In the example of FIGS. 4A and 4B, reference is made to other examples described herein, but it should not be construed as limiting. It should be understood that the method may be implemented by any suitable device or system. The method may be implemented, at least in part, by an operations processing device, such as the operations processing device 104 shown in FIGS. 1-3.

Referring to FIG. 4A, the method includes storing 402 update data on a first memory of a computing device. For example, update data may be stored on the first memory 106 of the computing device 102. The method also include initiating 404 an update mode on a second memory. For example, an update mode may initiated at the second memory 108 shown in FIG. 1. The operations processing device 104 may initiate the update mode on the second memory 108.

The method of FIGS. 4A and 4B includes suspending 406 an input/output operation of the second memory. For example, an I/O operation of the second memory 108 may be suspended. In some embodiments, the operations processing device 104 can suspend the I/O operation of the second memory 108.

The method of FIGS. 4A and 4B includes switching 408 the computing device to a system management mode (SMM). For example, the computing device 102 may be switched to a SMM. The operations processing device 104 may control switching of the computing device 102 to the SMM.

The method includes retrieving 410 the update data from the first memory. For example, the update data may be retrieved from the first memory 106. The operations processing device 104 may retrieve the update data from the first memory 106.

The method includes determining 412 whether the update data is valid. For example, the operations processing device 104 may determine whether the update data is valid or not. In response to determining that the update data is not valid, the method proceeds to step 414. Otherwise, the method proceeds to step 416. For example, the operations processing device 104 checks for the validity of the update data. The operations processing device 104 may validate the update data by checking the signature of the update data using a public key associated with the private key used to sign the update data. At step 414, the update of the second memory 108 may be prevented. For example, the operations processing device 104 may prevent the updating of the second memory 108.

At step 416, the method includes resuming the I/O operations of the second memory. For example, the I/O operation of the second memory 108 may be resumed for performing one or more operation on the second memory 108. The operations processing device 104 may control the resumption of the I/O operation of the second memory 108. Subsequently, at step 418, the method includes updating the second memory based on the update data. For example, the second memory 108 may be updated based on the update data. The operations processing device 104 may update the second memory based on the update data.

In an example, a valid BMC update executable may place update data also referred as candidate update image or update data into a first memory 106 (i.e., an SPI RAM) and may subsequently implement I/O operations to an SPI controller to place a second memory 108 (i.e., an SPI ROM) into an update mode prior to clearing the second memory 108 or ROM and writing the image to the second memory 108 (or SPI ROM). Subsequently, a valid BMC update executable may also place or store a pointer to or memory address of a memory location of the candidate update image or an update data into the first memory 106 (i.e., the SPI RAM). The update data may include the operations data for performing one or more operations on the ROM or the second memory. The update data may include strings of bytes, as an example. In some embodiments, the pointer to the memory address of the update data or the candidate image may be stored in an Advanced Configuration and Power Interface (ACPI) table of the computing device 102 (or 202). In some embodiments, the operations processing device 104 may store the pointer or the memory address into the ACPI table. Further in some embodiments, the transfer of the update data to the second memory 108 (or ROM) may be implemented via the system management interrupt (SMI) handler 306 and not the update executable as discussed with reference to FIG. 3.

Further, the computing device 102 (or 202) includes an operating system such as WINDOW®, LINUX®, etc. Prior to operating system boot, the system initialization code may enable an I/O trap or interrupt in a platform controller hub (PCH) or an Intel chip platform controller hub of the device 102, for the address/data that indicates a SPI controller register access for placing the SPI ROM or the second memory 108 into the update mode. System initialization code may also create the SMI handler (e.g., SMI handler 618 shown in FIG. 6), which is placed in system memory or first memory 106 for execution upon the CPU entering SMM mode. The operations processing device 104 (or 204) may include the SMI handler 306 that may be configured to retrieve the ACPI pointer to the update data and then validate the update data that is pointed to prior to completing the update data transfer to the second memory 108. Further, the SMI handler 306 or the operations processing device 104 may validate the update data by checking the signature of the candidate update image using a public key associated with the private key used to sign the update data or image.

Figure 5A:
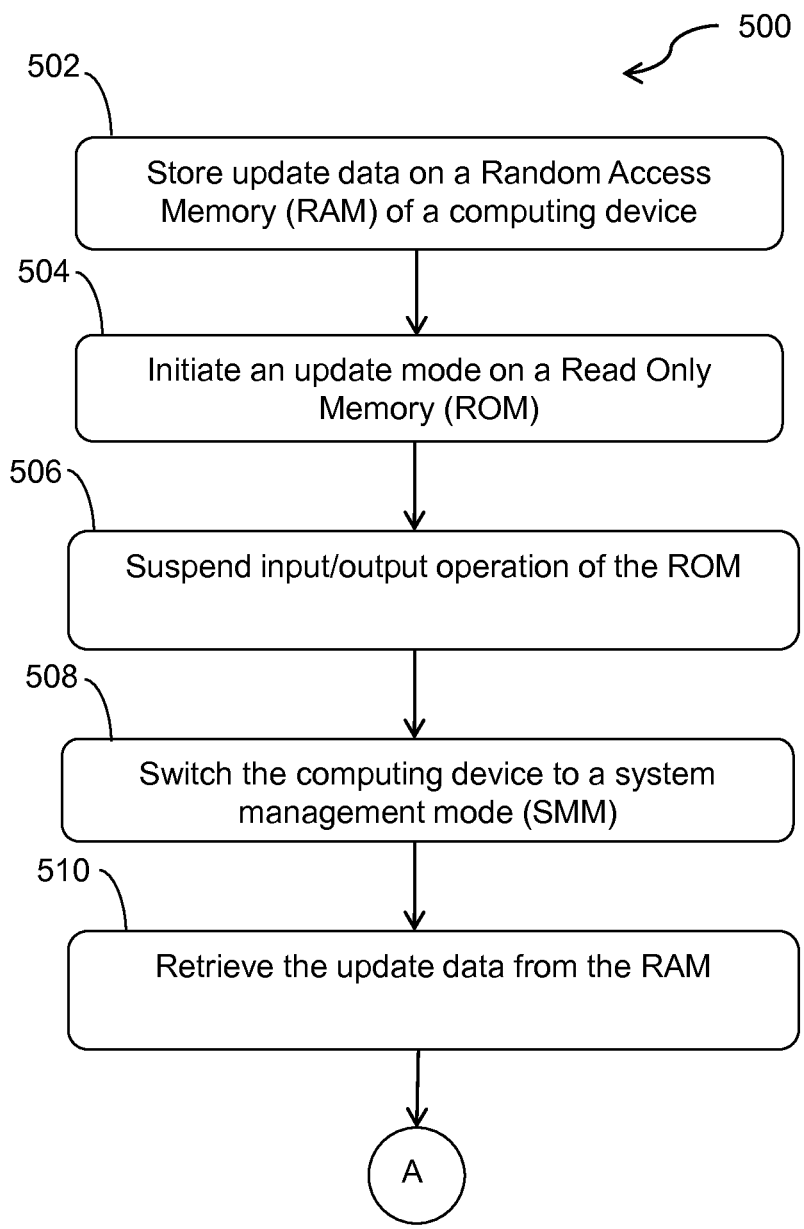
FIGS. 5A-5B is a flowchart illustrating an exemplary method for performing one or more operations on a Read Only Memory of a computing device, in accordance with an embodiment of the present disclosure.
Figure 5B:
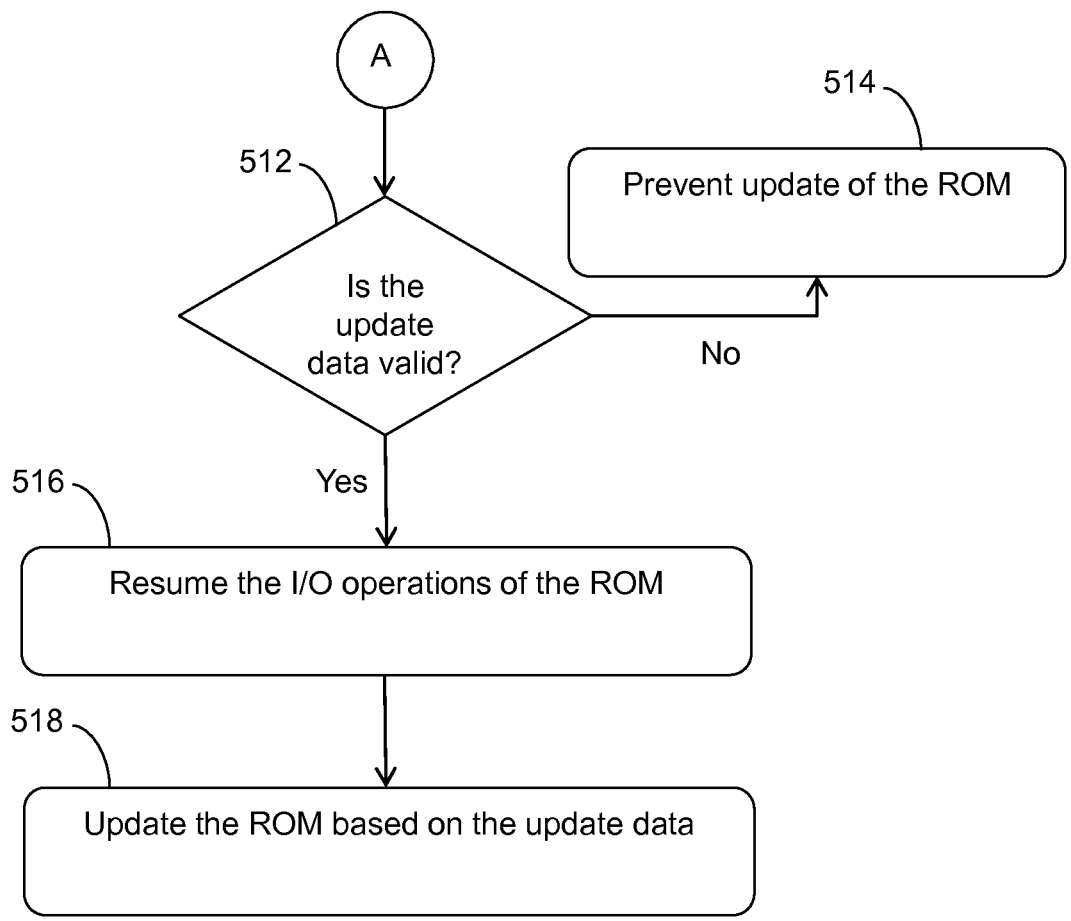

FIGS. 5A and 5B illustrates a flowchart of an example method 500 for performing one or more operations on a ROM in accordance with embodiments of the present disclosure. In the example of FIGS. 5A and 5B, reference is made to other examples described herein, but it should not be construed as limiting. It should be understood that the method may be implemented by any suitable device or system.

Referring to FIG. 5A, the method includes storing 502 update data on a RAM. For example, update data may be stored on the RAM 206 of the computing device 102. Subsequently at step 504, the method includes initiating an update mode on a ROM. For example, an update mode may be initiated at the ROM 208. In some embodiments, the operations processing device 204 may initiate the update mode on the ROM 208.

The method includes suspending 506 input/output operation of the ROM. Continuing the aforementioned example, an I/O operation of the ROM 208 may suspended. For example, the operations processing device 204 may suspend the I/O operation of the ROM 208.

The method of FIGS. 5A and 5B includes switching 508 the computing device to a SMM. Continuing the aforementioned example, the computing device 202 may be switched to an SMM. In some embodiments, the operations processing device 204 may switch the computing device 202 to the SMM. The method also includes retrieving 510 the update data from the RAM. For example, the update data may be retrieved from the RAM 206. As an example, the operations processing device 204 may retrieve the update data from the RAM 206.

The method includes determining whether the update data is valid. In response to determining that the update data is valid, the method may proceed to step 516. In response to determining that the update data is not valid, the process may proceed to step 514. The operations processing device 204 may determine whether the update data is valid. At step 514, update of the ROM may be prevented. The operations processing device 204 may prevent update of the ROM 208. At step 516, the I/O operation of the ROM may be resumed for performing one or more operations on the ROM. For example, the operations processing device 204 may control the resumption of operations on the ROM 208. At step 518, the method includes updating the ROM based on the update data. For example, the ROM 208 may be updated based on the update data. In some embodiments, the operations processing device 204 updates the ROM 208 based on the update data.

Figure 6:
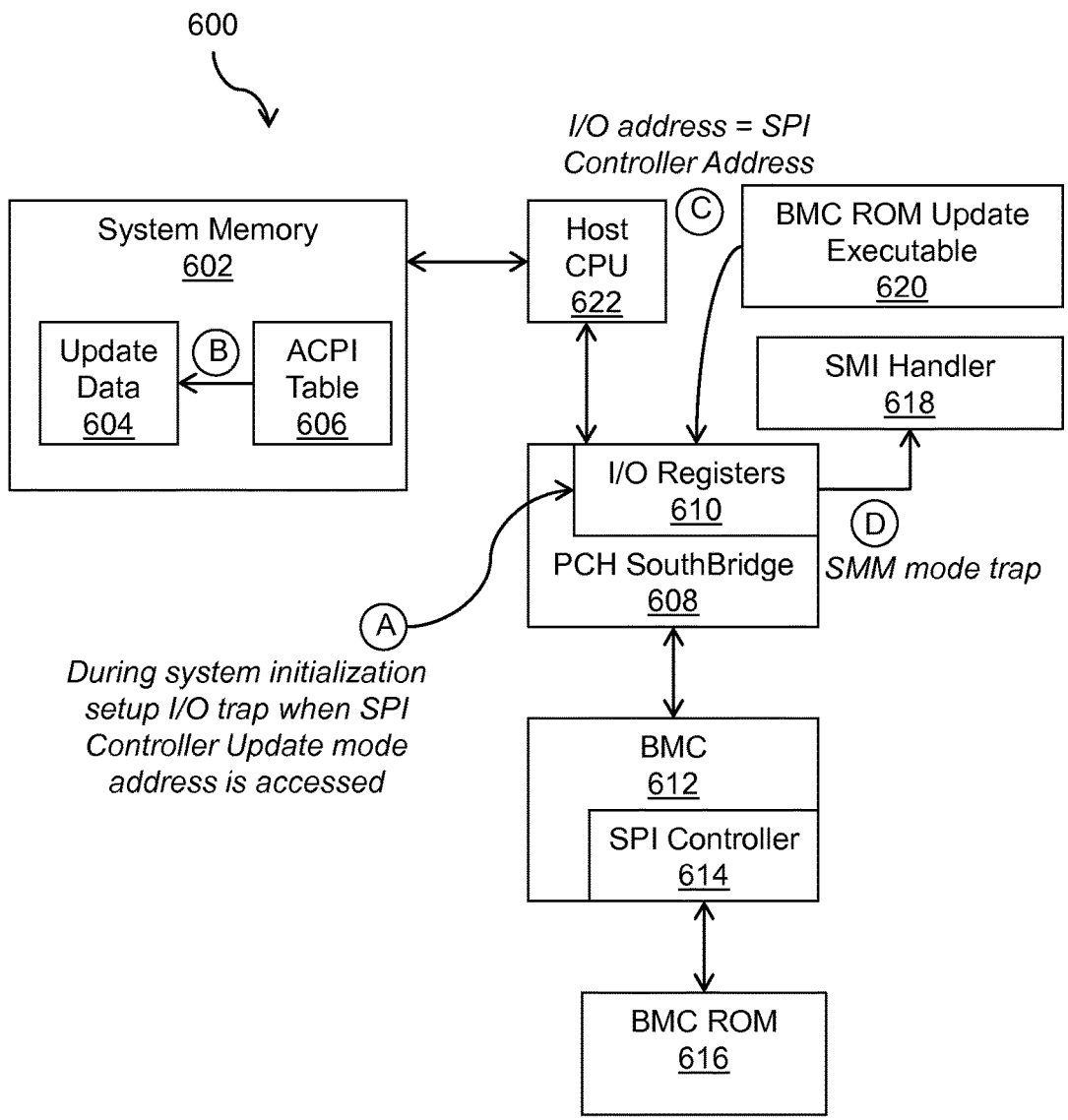
FIG. 6 is a block diagram illustrating a process flow for performing one or more operations on a baseboard management controller ROM (BMC ROM), in accordance with an embodiment of the present disclosure.

FIG. 6 illustrates a block diagram 600 depicting a process flow for performing operations on a BMC ROM in accordance with an embodiment of the present disclosure. Particularly, operations in this example are described as being performed on a BMC ROM 616. In an exemplary scenario, to protect the BMC ROM 616 (or SPI ROM) from an invalid update data being written on it, the example steps described here may be performed. As denoted by step A in FIG. 6, a system initialization code may enable or initiate an I/O trap in a computing device such as, the computing device 102 or 202 when an SPI controller 614 update mode is accessed. The operating system of the computing device 102 may boot the computing device 102. The system initialization code may include software, hardware, firmware, or combinations thereof required for initiating an OS on the computing device 102.

A valid BMC ROM update executable 620 may place an update image 604 or update data 604 into a system memory 602, such as the RAM 206 or first memory 106. In some embodiments, the operations processing device 104 or 204 places or stores the update image or data 604 into system memory 602. The manufacturer of the OS and/or the computing device 102 may provide the BMC ROM update executable 620. The BMC ROM update executable 620 may store a pointer to a memory location of the update data 604 in the system memory 602 (or first memory 106 or RAM 206). In some embodiments, the operations processing device 104 (or 204) or the BMC ROM update executable 620 can store the pointer to the memory location of the update data 604 in an advanced configuration and power interface (ACPI) table 606 as shown in step B.

Further, the BMC ROM update executable 620 may perform an I/O write to place the SPI ROM or ROM 208 into an update mode. Further, the BMC ROM update executable 620 may save an SPI controller address as shown in step C. In some embodiments, the I/O address is equal to the SPI controller address.

In accordance with embodiments, a PCH SouthBridge 608 may trap on this I/O write, stopping the I/O operation on the BMC ROM 616 (or ROM 208), and may force the computing device 102 to switch to a system management mode (SMM) as shown in step D.

Subsequently, an SMI handler 618 may be invoked. The SMI handler 618 may be similar in functionality and structure to the SMI handler 306 as discussed with reference to FIG. 3. The SMI handler 618 may be configured to determine an SPI controller update mode request from looking at the I/O trap information present in I/O registers 610. The SMI handler 618 may also read the pointer (or memory address of the memory location where update data 604 is stored) from the ACPI table 606. In some embodiments, the operations processing device 104 may read the ACPI pointer from the ACPI table 606. Subsequently, the update data 604 may be located using the ACPI pointer from the ACPI table 606. The SMI handler 618 may locate the update data 604 and check for the validity of the update data 604. In accordance with embodiments, the operations processing device 104 (or 204) locates and retrieves the update data 604 based on the ACPI pointer or memory address. Further, the operations processing device 104 may check for validity of the retrieved update data 604. The SMI handler 618 may validate the update data 604 by checking the signature of the candidate update data or image 604 using a public key associated with the private key used to sign the update data 604 or the update image 604. The update data 604 or the update image 604 may include string of bytes or data that may eventually be stored on the BMC ROM 616 (or the second memory 108).

When the update data 604 is determined to be valid, then the SMI handler 618 may allow the original I/O to complete, i.e. the I/O operation of the BMC ROM 616 is resumed. In some embodiments, the operations processing device 104 may resume the I/O operation of the BMC ROM 616. The SMI handler 618 may subsequently perform the remaining operations to update the BMC ROM 616 with the update data 604. When the update data 604 is determined to be invalid by the SMI handler 618, the SMI handler 618 may exit and may not allow the original I/O operation to complete, thus disallowing the update of the BMC ROM 616. In some embodiments, the operations processing device 104 can prevent the updating of the BMC ROM 616 with the update data 604.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    storing an update image data on a first memory of a computing device, wherein the update image data comprises data for updating a second memory on a firmware of the computing device;
    triggering an update mode of a serial peripheral interface (SPI) memory of the firmware based on an input/output (I/O) write operation at the second memory;
    trapping the I/O write at a first register of the computing device when the update mode is triggered;
    in response to trapping the input/output write, stopping the I/O write, switching to a system management mode (SMM), and invoking a system management interrupt (SMI) handler to determine the update mode based on the I/O write data trapped in the first register the computing device;
    retrieving, via the SMI handler of the computing device, the update image data from the first memory;
    determining, via the SMI handler, whether the update image data is valid; and
    in response to determining that the update image data is valid, updating the second memory on the firmware of the computing device based on the retrieved update image data, and
    wherein the update image data comprises operations data for performing one or more operations on the second memory on the firmware of the computing device, the second memory being read only memory (ROM) of a baseboard management controller (BMC).

2. The method of claim 1, wherein the storing and triggering steps are implemented by an executable utility.

3. The method of claim 1, further comprising:
    placing a pointer of the update image data onto an advanced configuration and power interface (ACPI) table by an executable utility;
    reading the pointer by the SMI handler;
    locating the update image data within the first memory of the computing device based on the pointer; and in response to locating the update image data, determining the validity of the update image data via the SMI handler.

4. The method of claim 3, further comprising storing, in the ACPI table, a memory address location where the update image data is stored in the first memory.

5. The method of claim 4, wherein retrieving the update image data comprises retrieving the update image data from the first memory based on the memory address location as obtained from the ACPI table.

6. The method of claim 1, wherein the first memory comprises a random access memory (RAM), and wherein the second memory comprises a read only memory (ROM).

7. The method of claim 1, wherein the chip comprises a platform controller hub.

8. The method of claim 1, further comprising preventing updating of the second memory with the update image data in response to determining that the update image data is invalid.

9. A system comprising:
a first memory of a computing device for storing update image data and updating a second memory on a firmware of the computing device;
an operations processing device configured to:
trigger an update mode of a serial peripheral interface (SPI) memory of the firmware based on an input/output (I/O) write operation at the second memory;
trap the input/output write operation at a first register of the computing device when the update mode is triggered;
in response to trapping the input/output write, stop the I/O write, switch to a system management mode (SMM), and invoke a system management interrupt (SMI) handler to determine the update mode based on the I/O write data trapped in the first register of the computing device;
retrieve, via the SMI handler of the computing device, the update image data from the first memory;
determine, via the SMI handler, whether the update image data is valid; and
in response to determining that the update image data is valid, update the second memory on the firmware of the computing device based on the retrieved update image data, and
wherein the update image data comprises operations data for performing one or more operations on the second memory, the second memory being read only memory (ROM) of a baseboard management controller (BMC).

10. The system of claim 9, wherein the input/output write is implemented by an executable utility.

11. The system of claim 9, wherein the chip comprises a platform controller hub.

12. The system of claim 9, wherein the first memory comprises a random access memory (RAM), and wherein the second memory comprises a read only memory (ROM).

13. The system of claim 9, wherein the operations processing device comprises at least one of a central processing unit and a platform controller hub.

14. The system of claim 9, wherein the input/output writes comprises a store, in an advanced configuration and power interface (ACPI) table, a memory address location where the update image data is stored in the first memory.

15. The system of claim 14, wherein the operations processing device is configured to retrieve the update image data from the first memory based on the memory address location as obtained from the ACPI table.

16. The system of claim 9, wherein the operations processing device is configured to prevent updating of the second memory with the update image data in response to determining that the update image data is invalid.

17. A computer program product for performing operations on memory, the computer program product comprising a computer readable storage medium having program instructions embodied therewith, the program instructions executable by a computing device to cause the computing device to:
store, by the computing device, an update image data on a first memory of a computing device, wherein the update image data comprises data for updating a second memory on a firmware of the computing device;
trigger an update mode of a serial peripheral interface (SPI) memory of the firmware based on an input/output (I/O) write operation at the second memory;
trap the I/O write at a first register of the computing device when the update mode is triggered;
in response to trapping the input/output write, stop the I/O write, switch to a system management mode (SMM), and invoke a system management interrupt (SMI) handler to determine the update mode based on the I/O write data trapped in the first register the computing device;
retrieve, via the SMI handler of the computing device, the update image data from the first memory;
determine, via the SMI handler of the computing device, whether the update image data is valid; and
in response to determining that the update image data is valid, update the second memory on the firmware of the computing device based on the retrieved update image data, and
wherein the update image data comprises operations data for performing one or more operations on the second memory, the second memory being read only memory (ROM) of a baseboard management controller (BMC).

* * * * *